United States Patent [19]

Ni et al.

[11] Patent Number: 5,528,268

[45] Date of Patent: Jun. 18, 1996

[54] CONTROL METHOD AND DEVICE FOR A MONITOR

[76] Inventors: Ray-Ing Ni, 186, Lane 437, Zeng-Shin Rd., Taichung; Lin Y. Shu, 4F No 2 Alley 7 Lane 41 Chen-Kong Rd. Sec. 4, Taipei; Da-Sun Hsu, 226-6 Chung Yang Rd., Fong Yeng, Taichung; Fong-Ing Lin, 7FL-1, 342, Sec.1, Keelung Rd.,, Taipei, all of Taiwan

[21] Appl. No.: 267,812

[22] Filed: Jun. 28, 1994

[51] Int. Cl.⁶ ................................ G09G 5/00
[52] U.S. Cl. .......................... 345/211; 348/819
[58] Field of Search .................. 345/156, 211; 348/552, 730, 819; 340/552, 573, 575

[56] References Cited

U.S. PATENT DOCUMENTS

| 4,417,278 | 11/1983 | Hensleigh et al. | 348/818 X |
|---|---|---|---|
| 4,716,469 | 12/1987 | Kim et al. | 348/818 |
| 4,831,448 | 5/1989 | Park | 348/818 X |
| 4,835,614 | 5/1989 | Ryu | 348/818 X |
| 4,853,678 | 8/1989 | Bishop, Jr. et al. | 340/573 |

FOREIGN PATENT DOCUMENTS

| 3837620 | 4/1989 | Germany | 345/156 |
|---|---|---|---|

*Primary Examiner*—Ulysses Weldon
*Attorney, Agent, or Firm*—W. Wayne Liauh

[57] ABSTRACT

A control method and device for a monitor, which is used for controlling the brightness, the vertical size, the horizontal size and the contrast of a monitor screen; by means of the minor and slow variation of the size and contrast of the monitor screen, a user's pupils can move naturally so as to reduce the fatigue of a user's: eyes. When the time set is up, a voice will be sent out to remind a user to have a break. The aforesaid device comprises an input setting unit, a microprocessor, a vertical size control circuit assembly, a horizontal size control circuit assembly, a contrast-control circuit assembly, a brightness-control circuit assembly, a voice module, a sensor, a power-supply control module, and a manual/automatic switch. The microprocessor will send out, in time sequence, an increasing or decreasing control value, in accordance with the ratio and period preset, to the various output-control modules to change the output-control modules to change the output voltage thereof so as to control the brightness, the contrast, the vertical size and the horizontal size of the monitor. By means of detest of the sensor, it can be determined whether the input power supply should be turned off or turned on, and whether an output signal should be sent out to control the output-control module and the voice module so as to save power and to control the image of the monitor.

10 Claims, 11 Drawing Sheets

CONTROL METHOD AND DEVICE FOR A MONITOR

BACKGROUND OF THE INVENTION

Figure 1:
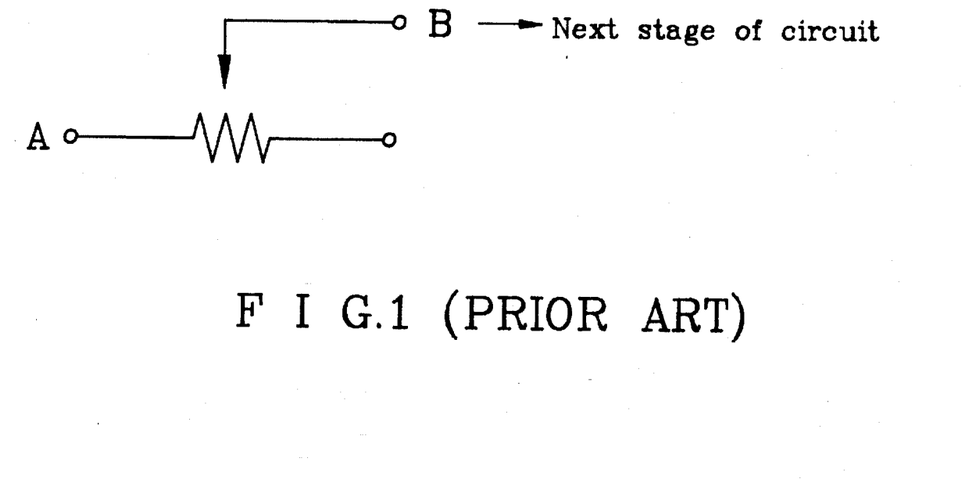
FIG. 1 illustrates a circuit for controlling a fluorescent screen of a monitor according to a conventional method.

The conventional monitor usually has several knobs beside the screen for adjusting various functions of the monitor; then, the monitor can be adjusted manually in brightness, the vertical size, the horizontal size and the contrast thereof. Such adjustment is based on the adjustment of several rheostats through the tuning knobs respectively; when a rheostat is adjusted, the circuit following the rheostat will also be changed; such an adjustment circuit is shown in FIG. 1, in which the resistance between two points A and B will vary upon the knob being turned; the point B is connected with the next stage of circuit. The image of the conventional monitor is adjusted only by means of a manual adjusting method; after each adjustment, the image will stay as it is without change until a further adjustment is made; as a result, the monitor in real use has to be adjusted manually to obtain a fixed brightness and contrast. Consequently, a user after a given period of time often has tired eyes. Furthermore, some users often forget the time when working before such a monitor, i.e., forgetting to have a break which is necessary; another, a user of such a monitor is subject to suffering from a non-remedial eye disease after working for along period of time because of his (or her) eyes being under a tired and pressure condition for a long time.

SUMMARY OF THE INVENTION

The primary object of the present invention is to provide a control device and method, which can automatically control the brightness, the vertical size, the horizontal size and the contrast of a monitor screen; by means of the slow and minor change of the size and contrast of the monitor screen, the user's pupils will move naturally and freely so as to reduce the eye tiredness; when the setting time is up, a voice will be sent out to remind the user to have a break in order to minimize the worse condition of the short-sighted eyes.

Another object of the present invention is to provide a control method for a monitor, and such a device is comprised of an input setting unit for setting a given data of ratio and a period, a micro-processor can receive and process the data from the input setting unit so as to send out, in time sequence, and increasing or decreasing control value or values to several output—control modules to generate an output voltage for controlling the brightness, the contrast, the vertical size, and the horizontal size of the monitor screen.

Still another objective of the present invention is to provide a control device, which can automatically turn off/on the input power supply of the monitor; the control device includes a sensor and power supply control modules. By means of the detection of the sensor and the period set in the input setting unit, it can determine whether the input power supply of the monitor should be turned off or turned on again in order to save power.

DETAILED DESCRIPTION

The preferred embodiment of the present invention is comprised of an input setting unit, a micro-processor, a vertical-size control circuit, a horizontal-size control circuit, a contrast control circuit, a brightness control circuit, a voice module, a sensor, a power-supply control module and a manual/automatic switch. An increasing or a decreasing control value can be generated in accordance with a ratio set and a period set of an input setting unit, and then is sent to various output control modules so as to change the output voltage and to control the brightness, the contrast, the vertical size, and the horizontal size of a monitor; the voice module can remind a user to take a rest break after a period of time set.

The control method, when it is set in automatic mode, can sense whether there is a user before the monitor; if not, a clock will be used to estimate whether the user has left the monitor for a period of time over the time set; if yes, the power supply will be turned off. If there is a user before the monitor, the micro-processor will, in accordance with the value set in the input setting unit such as the ratio variation and the period, have an output of increasing or decreasing value to be sent into an output-control module so as to change the output voltage controlling the monitor. Under the condition of using the voice, the information will be sent out in accordance with the time and period set from the voice modules.

According to the present invention, the multi-resistor set is connected, in parallel, with the points A and B of the rheostat; such resistors will be switched automatically after a given period of time according to a period set, i.e., point A is applied with an automatically varied power supply C; in that case, the whole resistance value will be varied so as to vary the brightness, the vertical size, the horizontal size and the contrast.

Figure 2:
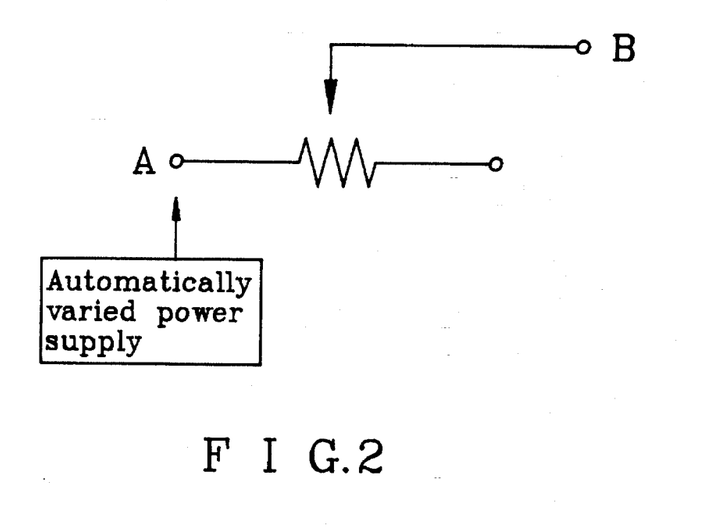
FIG. 2 is a circuit for controlling a fluorescent screen of a monitor according to the present invention.
Figure 3:
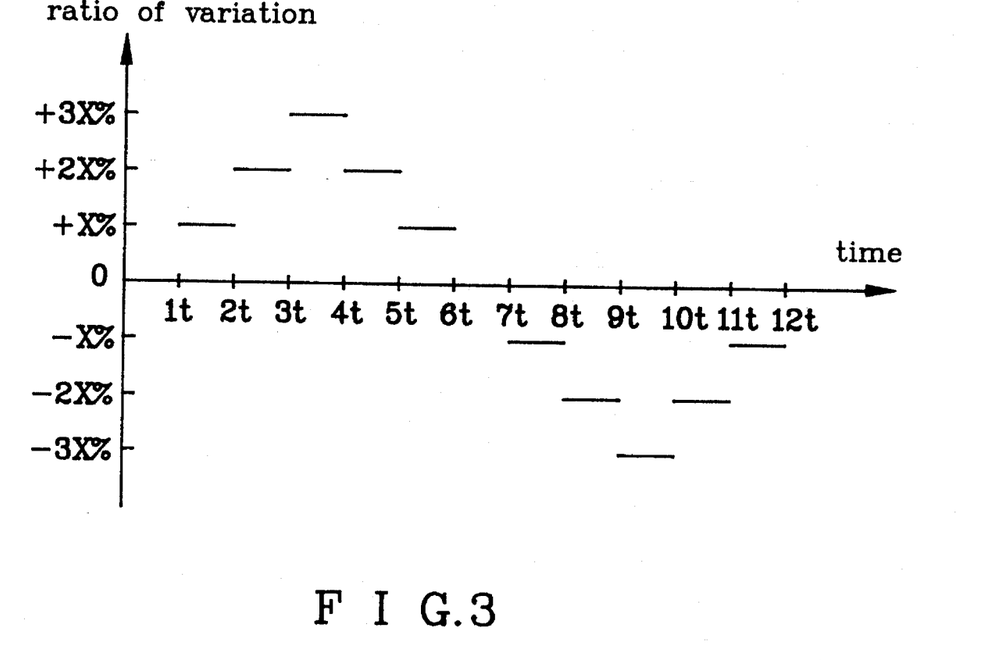
FIG. 3 illustrates the variation relation between the voltage and time in the circuit as shown in FIG. 2.

Point A can be pulled out without affecting the circuit of the last stage, or may be connected with a fixed power source only; in such a case, the voltage on point A can be controlled to vary with the period and amplitude set so as to change the brightness, the horizontal size, the vertical size, and the contrast simultaneously. As shown in FIG. 2, point A is connected with a variable voltage. The relation between the variation and the time of the aforesaid two method is shown in FIG. 3, in which the more the stages, the more the variations.

Figure 4:
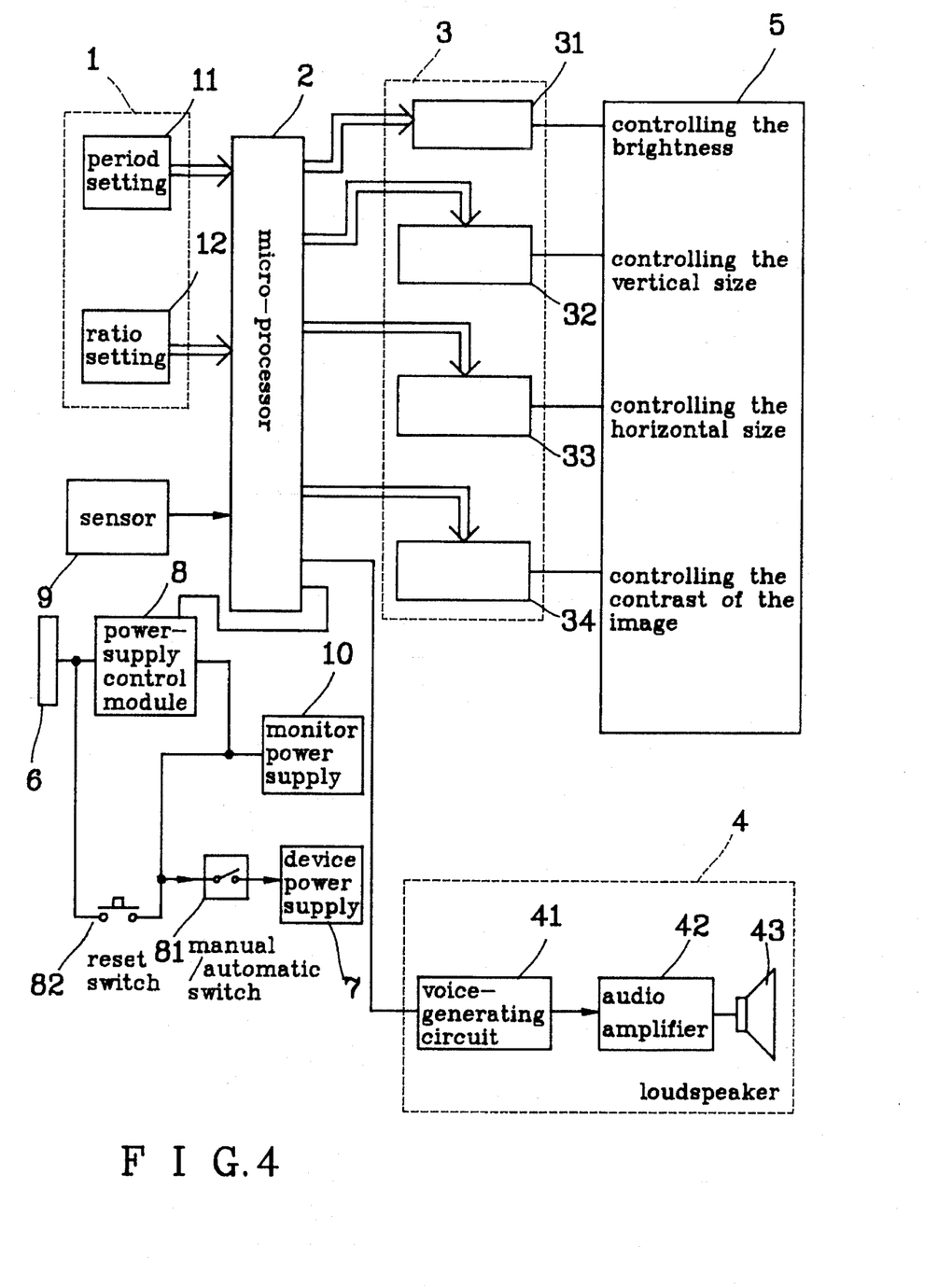
FIG. 4 is a block diagram of the whole system according to the present invention.

FIG. 4 is a block diagram of the whole system according to the present invention, in which the input setting unit 1 will be used by a user to put a value set therein. The unit 1 can provide a period setting 11 and a ratio setting so as to send a time signal, a period signal and a ratio signal into the micro-processor 2.

The micro-processor 2 is used for processing the input signals from the input setting unit 1 and the sensor 9, and for sending control signals to the output control modules 31, 32, 33, 34 and the voice module 4; the micro-processor 2 can, by means of the inner programs, perform control points functions, such as switching resistors, and triggering the voice-generating circuit.

The output—control modules 3 includes several control circuit assemblies, of which each is connected with an output port of the micro-processor 2; each output-control module includes a vertical size control circuit assembly 31, a horizontal-size control circuit assembly 32, a contrast-control circuit assembly 33, and a brightness-control circuit assembly 34. Each of the aforesaid circuit assemblies is controlled with an output signal of the micro-processor 2 so as to control the output voltage thereof, and to control the brightness, the horizontal size, the vertical size and the contrast of the image in the monitor 5.

The voice module 4 includes a voice-generating circuit 41, an audio amplifier 42 and a speaker 43. The voice-generating circuit 41 can provide a reminding voice; the voice function of the circuit 41 is controlled with the output signal of the micro-processor 2, and the voice signal usually passes through the audio amplifier 42 and the loudspeaker 43.

The power supply system of the present invention includes an input power supply 6 for the whole circuit thereof, a monitor power supply 10 for the monitor only, and a device power supply 7.

The sensor 9 of the present invention can sense whether there is an object in front of the monitor; the output of the sensor can provide the micro-processor 2 to judge whether to turn off the power supply or not. The sensor may be an infrared sensor.

The power-supply control module 8 is installed between the input power supply 6 and the monitor power supply 10 so as to provide a function of turn-off/turn-on the input power supply in accordance with the signal of the sensor 9.

The manual/automatic switch 81 is installed between the device power supply 7 and the input power supply to provide a manual/automatic switching function, i.e., when the manual switch is set, the device can be operated with the conventional mode. A reset switch 82 is also furnished to let a user turn on the power supply again-upon the user returning before the monitor after leaving the monitor for a given period of time.

The input setting unit 1 can be set with a given value (i.e., a ratio and a period) for controlling the output results, such as the brightness, the contrast and the size of an image so as to alleviate stimulation to a person's eyeball, and to have a person's pupil moved adequately in order to relax the eye muscle and to prevent the eyes from getting tired.

The value set (time) enables the voice module to send out a reminding words or music to a person to have a break so as to prevent a person's eyes from getting tired, and to relax a person's mind.

The sensor can detect whether a person is there or not so as to determine whether the input power supply should be turned off or not in order to save energy. Generally, when the computer monitor is turned off, about 100 watts of power can be saved.

By means of the sensor 9, it can be determined whether the input power supply should be turned off or turned on.

By means of the input setting unit 1, the micro-processor 2 can send an output signal or an input signal into the various control modules 3 and the voice module 4 so as to save power in the monitor 5 and to control the image therein.

DESCRIPTION OF THE EMBODIMENT

Figure 5:
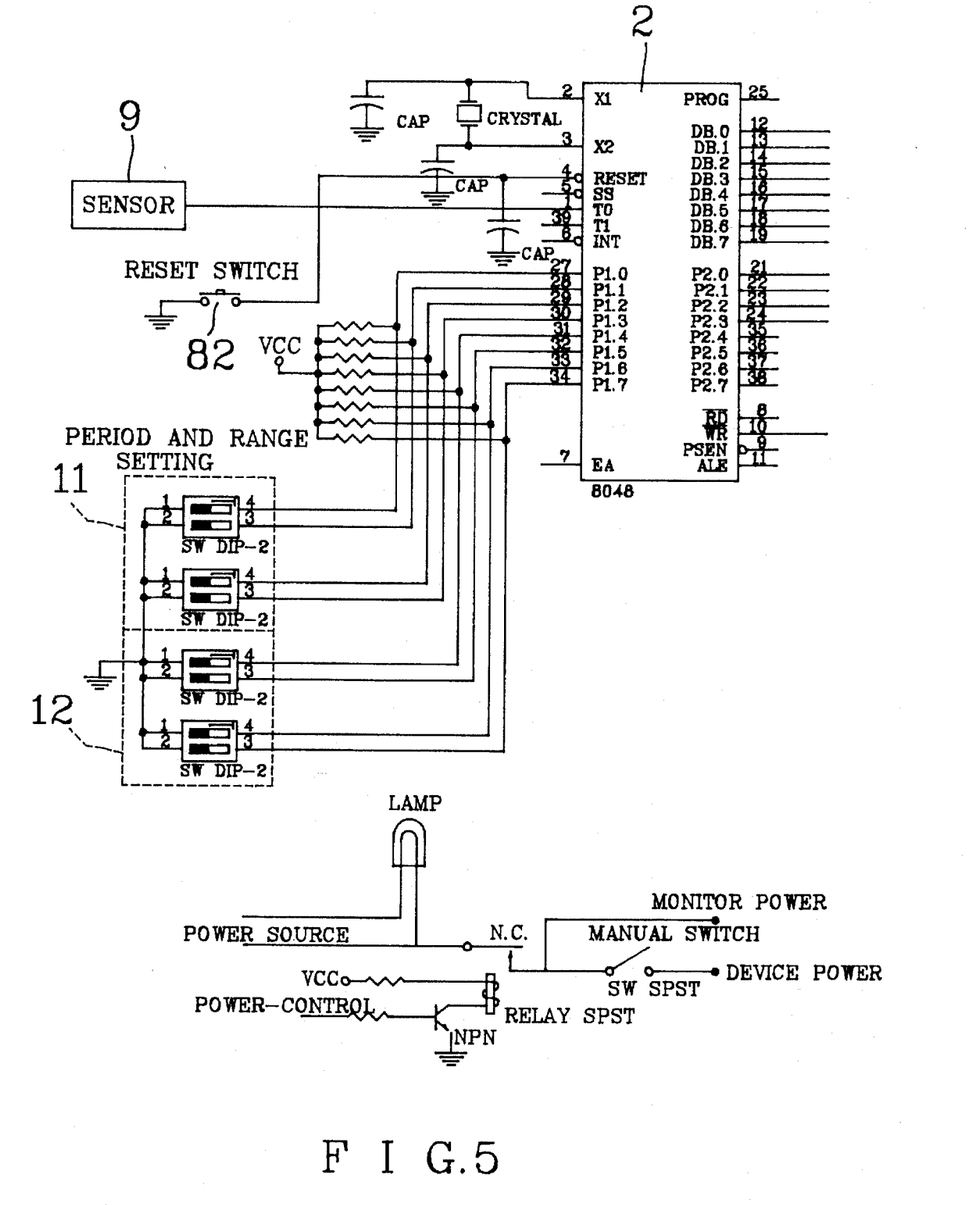
FIG. 5 illustrates an embodiment circuit-1 according to FIG. 4.
Figure 6:
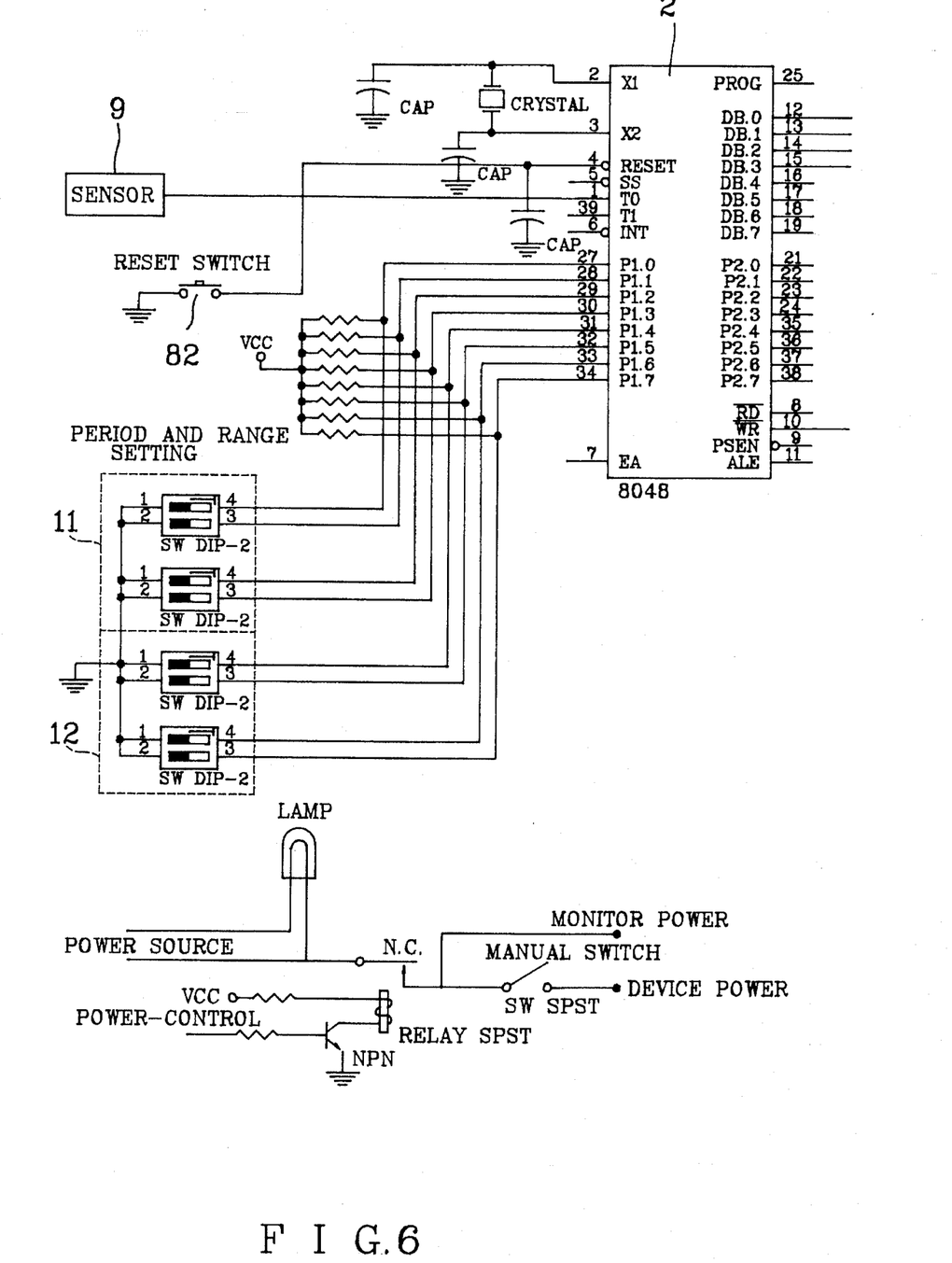
FIG. 6 illustrates an embodiment circuit-2 according to FIG. 4.
Figure 7:
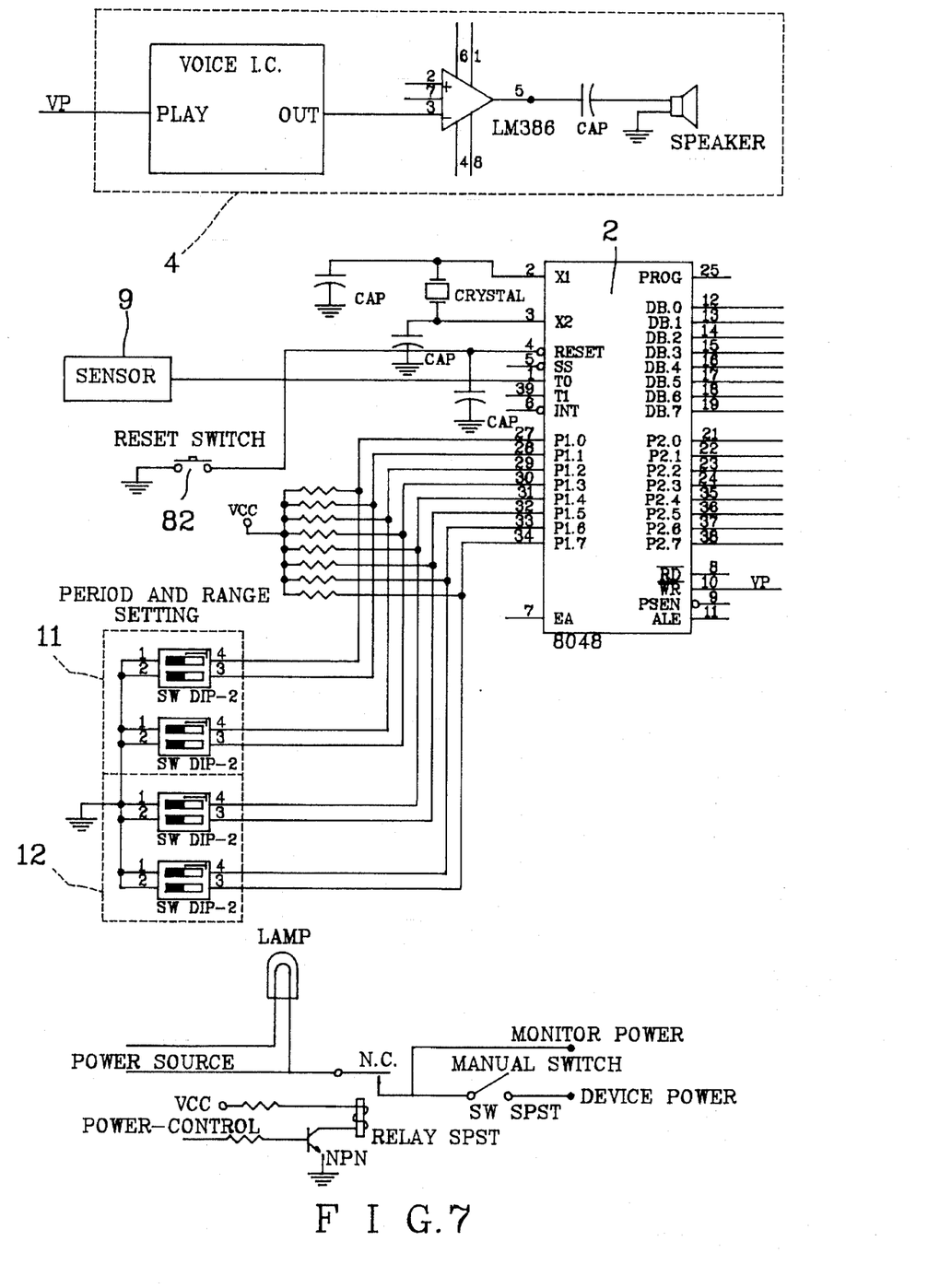
FIG. 7 illustrates an embodiment circuit-3 according to FIG. 4.

In order to provide a system function according to the present invention as shown in FIG. 4, the present invention has several embodiments as shown in FIGS. 5, 6 and 7. In the following description for the aforesaid embodiments, those circuits which have the same functions will be marked with the same reference symbols. FIG. 5 illustrates the first embodiment circuit, in which the output control module 3 includes a digital-to-analog converter (such as a D/A converter IC DAC0800) and a power amplifier. The micro-processor 2 can be a single chip (such as 8048); the outports of the micro-processor can send a digital control signal into a digital-to-analog converter, in which the signal is converted into an analog voltage, and then such analog voltage will be amplified adequately through a power amplifier so as to drive a following circuit. For instance, the vertical size control circuit assembly 31 has 74LS373 connected with the micro-processor 2 so as to receive data from the micro-processor, and to convert the same into a voltage signal. The high and low of the voltage signal are used to control the vertical size of the monitor, while the horizontal-size control circuit assembly 32 is used to control the horizontal size of the monitor. The contrast-control circuit assembly 33 is used to control the contrast of the monitor; the brightness-control circuit assembly 34 is used to control the contrast of the monitor.

FIG. 6 illustrates the second embodiment according to the system as shown in FIG. 4; the various control circuits of the output-control module 3 include an analog switch and a plurality of multi-resistor sets; the analog switch (such as 4052) is to be controlled with the micro-processor 2, and when a given number of channels are opened or closed, one resistor of the multi-resistor set behind the channel will be connected or disconnected to vary the resistance in the circuit so as to vary the output voltage, which will, in turn, provide an output signal to vary the vertical size, the horizontal size, the contrast and the brightness.

Figure 8:
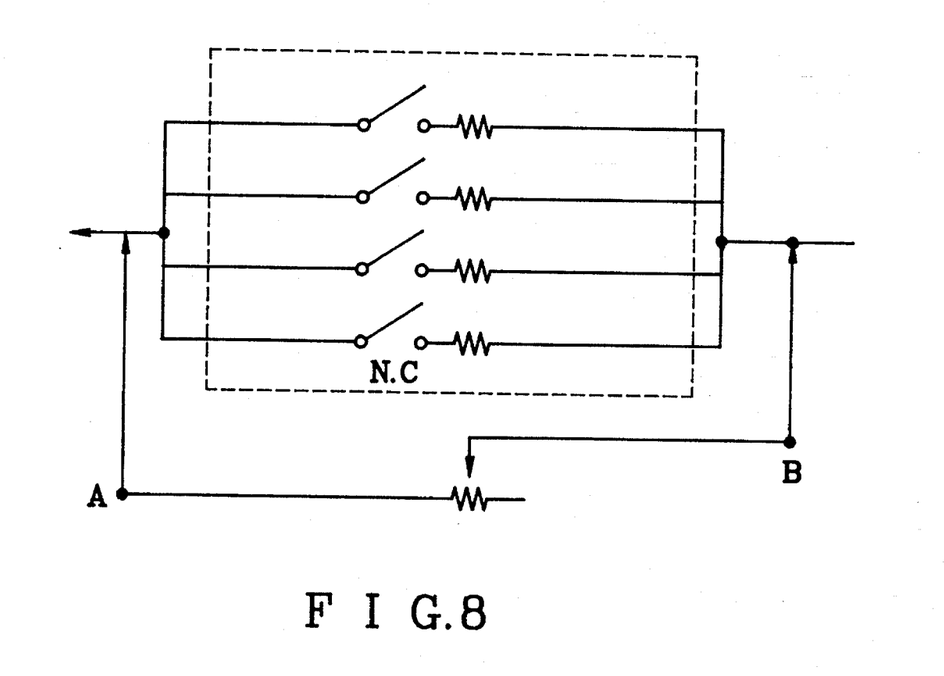
FIG. 8 illustrates the multi-resistor sets shown in FIG. 7 being connected in parallel, of which both ends are connected with both ends of a rheostat shown in FIG. 1.

FIG. 7 illustrates the third embodiment according to the system as shown in FIG. 4; the third embodiment can also send out a vertical size signal, a horizontal size signal, a contrast signal and a brightness so as to control the image in the monitor. The output-control module 3 includes a vertical-size control circuit assembly 31 for controlling the vertical-size signal, a horizontal-size control circuit assembly 32 for controlling the horizontal-size signal, a contrast-control circuit assembly 33 for controlling the contrast signal, and a brightness-control circuit assembly 34 for controlling the brightness signal. All the aforesaid signals are used for controlling the image results in the monitor. Each of the aforesaid control circuits has a resistor which is controlled with a corresponding relay, which is controlled with an output terminal of the micro-processor 2 to be set in on or off condition so as to have the resistor connected with the corresponding relay set in a connected or disconnected condition, and to vary the whole resistance in the circuit, and then an output voltage will be varied. In the aforesaid embodiment, one channel of the multi-resistor set can be set in a normally connected condition; as shown in FIG. 8, the various resistor sets are connected in parallel, and both ends thereof are connected with the two ends A and B of a rheostat; such an arrangement of the circuit enables a user to adjust the rheostat, which is normally a type of turnin knob, with the user's hand so as to adjust the brightness, the size of the screen and the contrast of a monitor to a reference value as desired; then, the device according to the present invention can be controlled around the reference value in accordance with the period and ratio set.

The input setting unit 1 in the aforesaid embodiments is designed with a micro-type dip switch to set an input therein.

Figure 9:
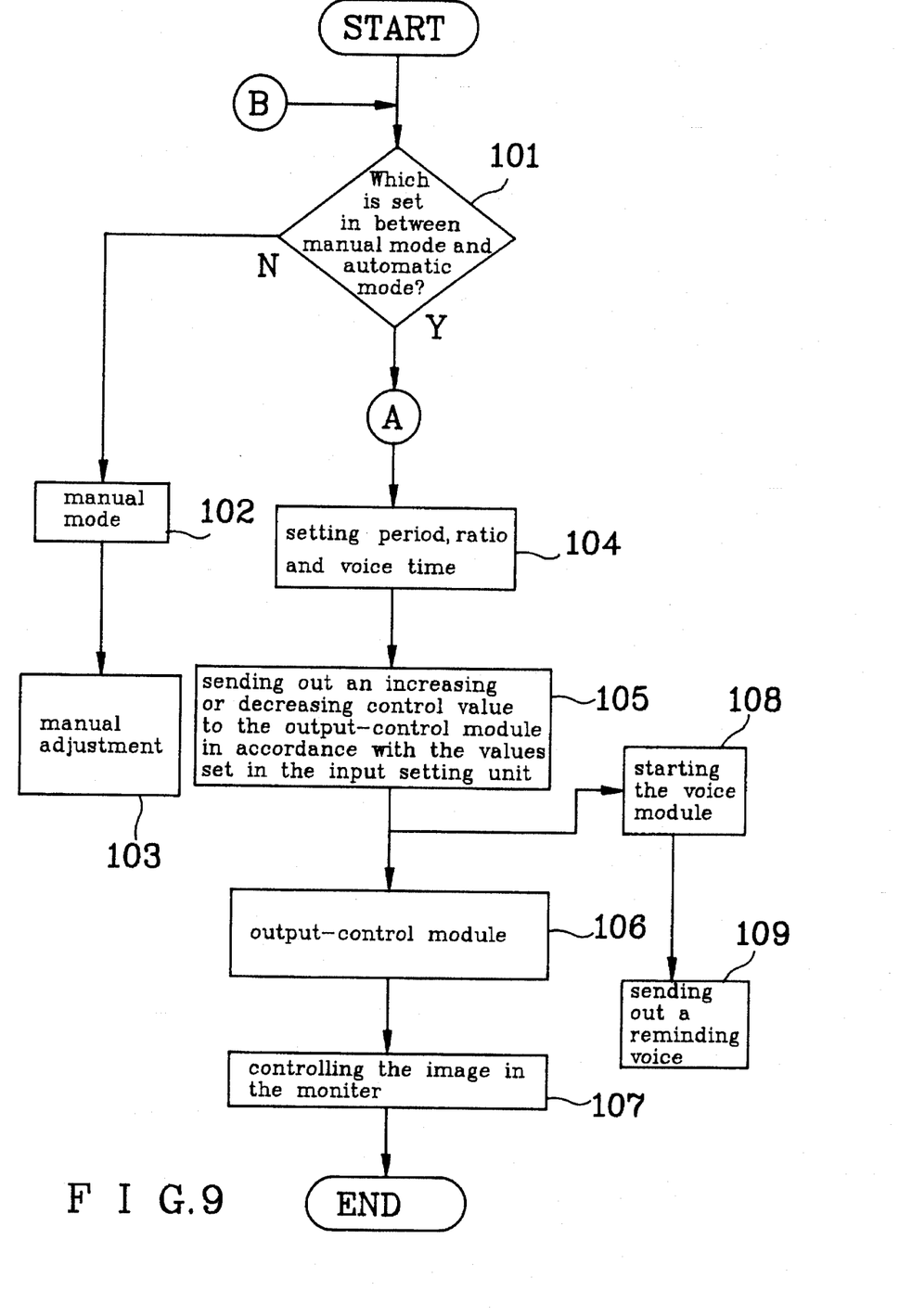
FIGS. 9 and 10 illustrate a flow chart according to the present invention.
Figure 10:
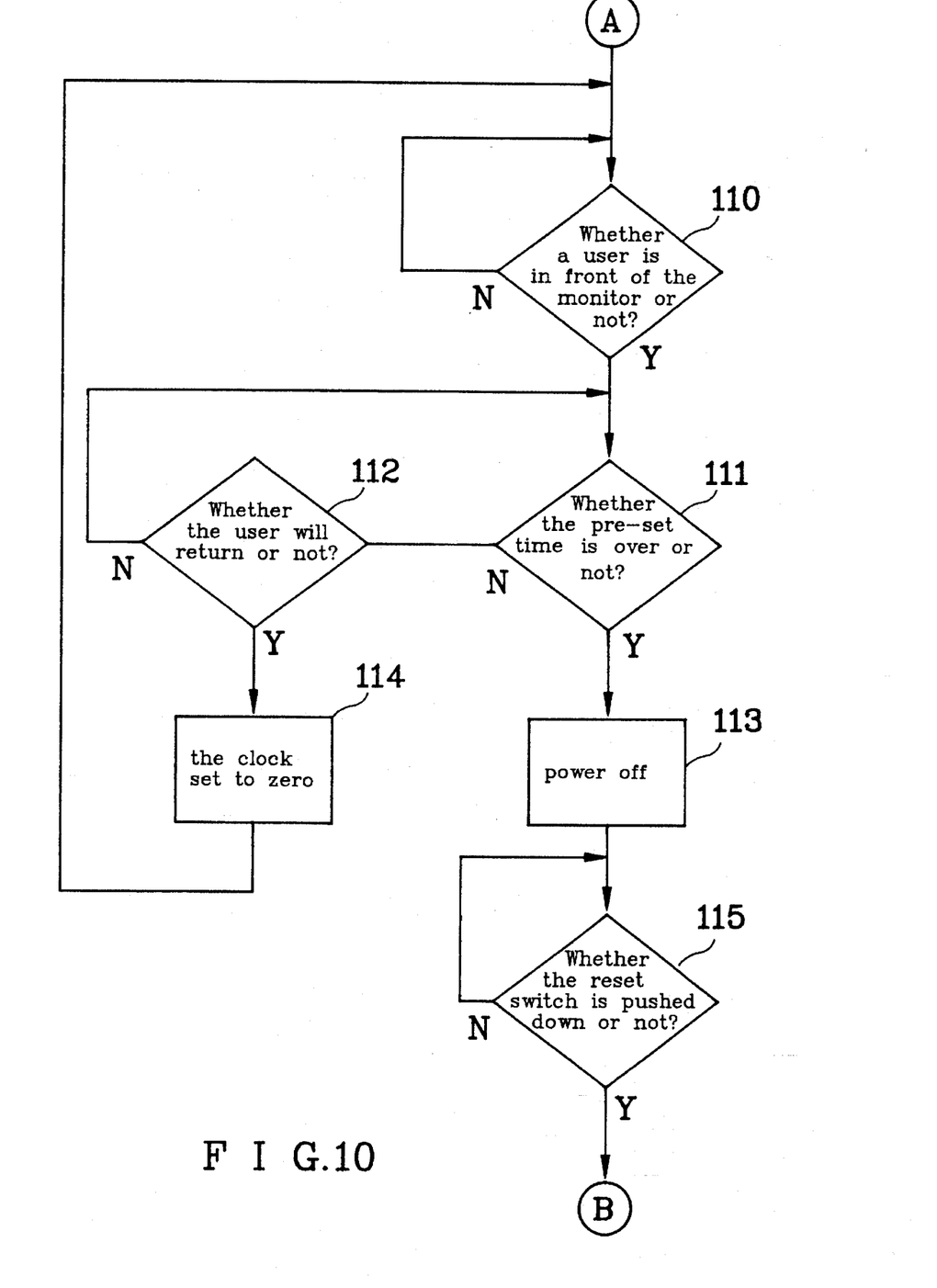

FIGS. 9 and 10 illustrate the control flow chart of the present invention, of which the operation procedures are described as follows:

After the control program is started, first, the user should check the step 101 of manual/automatic switch whether it is set in manual or automatic control mode for the monitor; if the answer is "NO", the manual adjustment 103 of general operation method will be performed. If the answer is YES, the micro-processor will, through the sensor, detect whether a user 110 is in front of the monitor or not. Referring to FIG. 10, if a user is there, the operation will be returned before the step 110 If there is no user the operation will be returned to step 111 to let the microprocessor judge whether the user has left the monitor over a period of time pre set; if the answer is "NO", it should judge whether the user will return or not 112; if the answer is "NO", the operation procedure will return before the step 111 to test continually whether the pre-set time is over or not. If step 112 has detected that the user has returned, the step 114 should be performed to have the clock set to zero. In step 111, if the user has left the monitor over a pre-set time, the power supply will be turned off in step 113, and a step 115 to detect the condition of the reset switch should be done; after the reset switch is pushed down, the operation will be performed again, i.e., returning the operation condition before step 101 as shown in FIG. 9.

Referring to FIG. 9, when the system is operated in the automatic mode by means of step 101, the input setting unit can be set with the step 104 of period, ratio and voice time. In the step 105, the micro-processor will send out an increasing or decreasing control value to the output-control module 106 in accordance with the values set in the input setting unit (if no value has been pre-set, the inner value will be used) so as to change the output voltage for performing the step 107 to control the image in the monitor; simultaneously, the voice module may be started in step 108 to send out a reminding voice 109 to provide a reminder function.

According to the aforesaid description, this invention is deemed a novel disclosure, having an industrial value and being patentable.

We claim:

1. A control device for controlling the image of a monitor comprising:

a micro-processor, an output-control module, an input power supply and a monitor power supply;

an input setting unit for setting a period and a ratio so as to provide said micro-processor with a time signal, a period signal and a ratio signal;

said micro-processor containing means for processing input signals from said input setting unit and a sensor, and for sending out control signals to said output-control module;

said output-control module including a vertical-size control circuit assembly, a horizontal-size control circuit assembly, a contrast-control circuit assembly, and a brightness-control circuit assembly; said vertical-size control circuit assembly, horizontal-size control circuit assembly, contrast-control circuit assembly, and brightness-control circuit assembly installed between said micro-processor and said monitor being controlled by means of output signals from said micro-processor so as to control and to adjust output voltages for controlling brightness, horizontal size, vertical size and contrast of an image in said monitor;

said sensor being provided for detecting whether an object is present in front of said monitor; said sensor containing means for sending a sensor signal to enable said micro-processor to judge whether to turn off power supply of said monitor;

a power-supply control module installed between said input power supply and said monitor power supply, and being used for turning off or turning on said monitor power supply in accordance with said sensor signal from said sensor;

whereby said micro-processor sending out art increasing or decreasing value to said various output-control modules for changing output voltages thereof so as to control brightness, contrast, vertical size and horizontal image stimulation effect of said monitor; and by means of said sensor, said micro-processor being able to determine whether to turn off or turn on power supply, and to send out output signals to control said output-control module in order to save power and control said image in said monitor.

2. A control device for a monitor as claimed in claim 1, wherein said output-control module further including a voice module, which comprises a voice-generating circuit, which is connected to an audio amplifier and a speaker; said voice-generating circuit contains a pre-recorded reminding message which is controlled by an output signal from said micro-processor and is amplified by said audio amplifier to drive said speaker.

3. A control device for a monitor as claimed in claim 1, wherein said control circuits of said output-control module includes a digital-to-analog converter and a power amplifier.

4. A control device for a monitor as claimed in claim 1, wherein said control circuits of said output-control module includes a multi-resistor set and a plurality of relays.

5. A control device for a monitor as claimed in claim 4, wherein each said control circuit of said output-control module includes an analog switch and a said multi-resistor set.

6. A control device for a monitor as claimed in claim 5, wherein one channel in said multi-resistor sets of said control circuits of said output-control module is normally in a turned-on condition; said resistors in said multi-resistor sets being connected in parallel; and both ends of said resistors connected in parallel with both ends of a rheostat for controlling brightness, contrast, vertical size and horizontal size of said monitor.

7. A control device for a monitor as claimed in claim 1 which further includes a manual/automatic switch installed between a device power supply and said input power supply so as to provide a manual/automatic switching function.

8. A control device for a monitor as claimed in claim 1, wherein said input setting unit is a small dip switch.

9. A control device for a monitor as claimed in claim 1 which further includes a reset switch installed between said input power supply and said manual/automatic switch.

10. A control method for controlling the image of a monitor comprising the steps as follows:

(a) determining whether or not to use an automatic control for said monitor;

(b) adjusting said monitor with a general manual operation manner when a automatic mode is not in operation;

(b) sensing whether having a user existing before said monitor or not;

(c) judging whether said user having left there over a period of time present, if answer being yes, said input power supply being turned off, and said step (a) being performed again upon said reset switch being pushed down;

(d) setting the value in said input setting unit being coupled to said micro- processor, and according to ratio variation, period, an increasing or decreasing control value in time sequence being sent to said output-control module so as to vary an output vary an output voltage for controlling said monitor;

(e) sending out a reminding voice which being triggered in time sequence in order to remind the user; and (f) controlling said brightness, contrast, vertical size and horizontal size of said image of said monitor.

* * * * *